Jan. 14, 1969

C. J. SADEK 3,421,613

RESILIENT TUBULAR CONVEYOR

Filed Dec. 20, 1966

Curtis J. Sadek
INVENTOR.

Jan. 14, 1969

C. J. SADEK 3,421,613

RESILIENT TUBULAR CONVEYOR

Filed Dec. 20, 1966

Curtis J. Sadek
INVENTOR.

BY
Attorneys

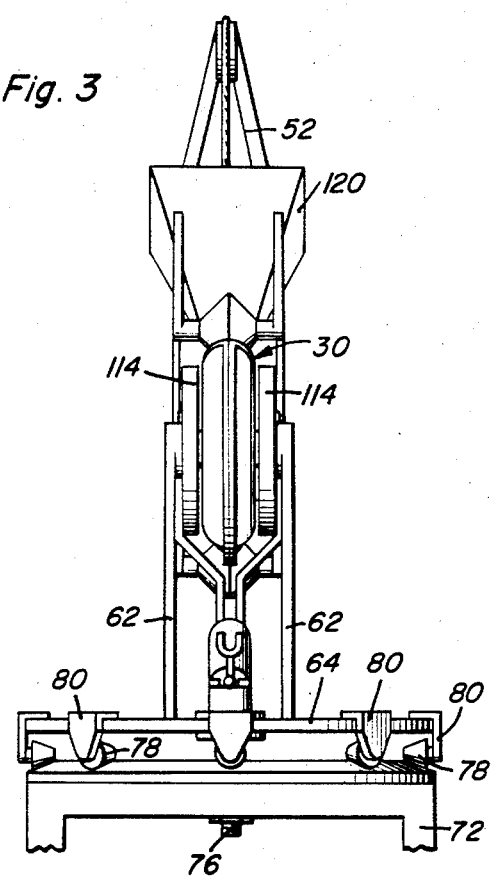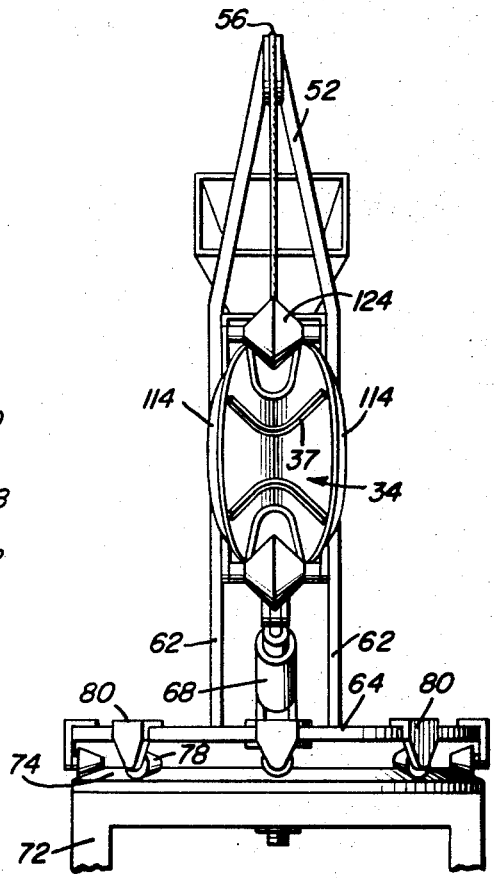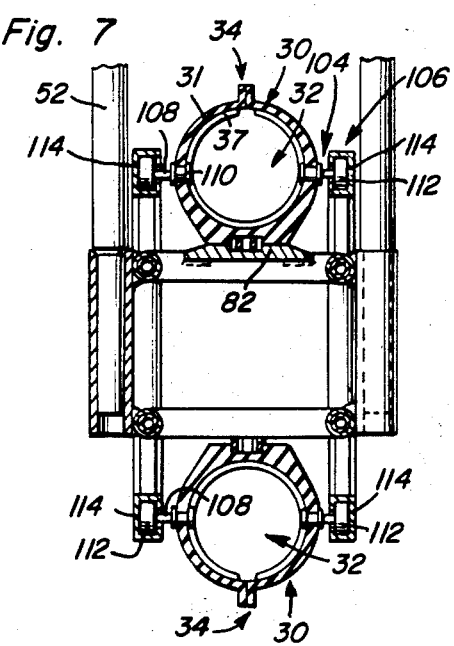

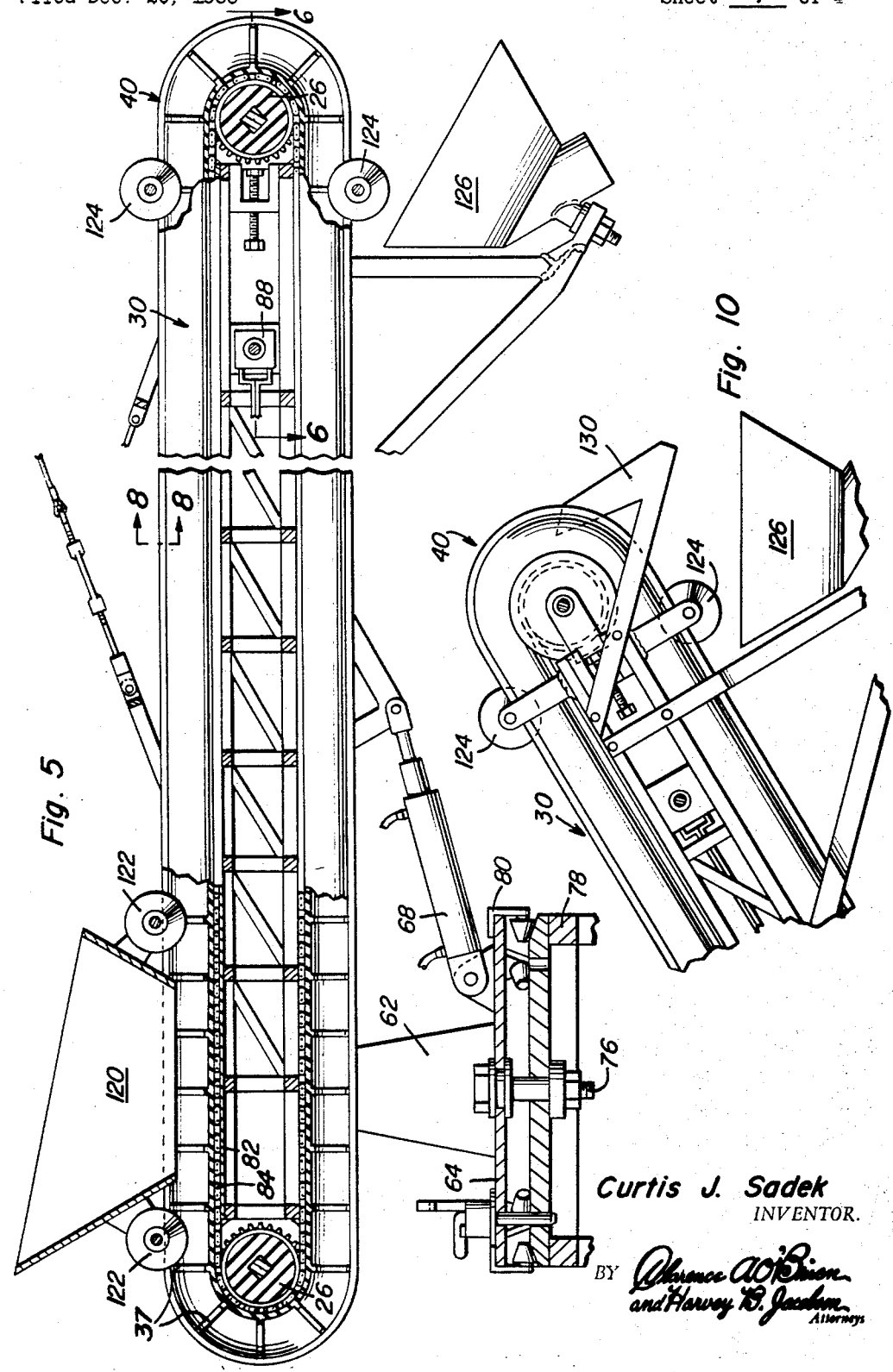

United States Patent Office 3,421,613
Patented Jan. 14, 1969

1

3,421,613
RESILIENT TUBULAR CONVEYOR
Curtis J. Sadek, 7300 8th St., Rio Linda,
Calif. 95673
Filed Dec. 20, 1966, Ser. No. 603,227
U.S. Cl. 198—184                8 Claims
Int. Cl. B65g 15/08

ABSTRACT OF THE DISCLOSURE

A conveyor for viscous fluent material comprising a rotatably mounted boom including coextending boom side frame portions having roller means rotatably mounted therebetween adjacent the ends of the boom and wherein the boom side frame members include opposed continuous anti-friction roller guide tracks. A resilient tubular conveying member is entrained about the roller means and includes a plurality of antifriction roller members carried thereby in diametrically opposed outwardly projecting relation thereto and wherein the anti-friction rollers thereof track within the aforementioned anti-friction roller track means to normally maintain the tubular conveyor member closed. At points spaced along the boom, coinciding with the loading and discharging points for the conveyor, means are provided for opening the tubular conveying member which is provided with an axially extending radial slit through the wall thereof. At the aforementioned selected points the tubular member is opened by the simultaneous utilization of a wedge-shaped wheel interposed in the path of tubular member so as to cause an abutment for physically separating the side walls of the tubular member at the site of the radial slit and a positive outwardly camming effect imposed upon the side walls of the tubular member by virtue of the anti-friction roller track means curving outwardly contiguous with the preselected charging and discharging points.

This invention relates to endless belt conveyors of the resilient tubular type and more particularly to resilient tubular conveyors adapted for the vertical lifting of relatively viscous plastic materials such as cementitious compositions.

Tubular endless belt conveyors of the above-mentioned type have been proposed heretofore and are generally in the form of a unitary tubular belt having a slit extending along one side through which material is received or discharged when the belt is opened. However, the means incorporated in such belts to effect the opening and closing of the tube are somewhat less than satisfactory.

It is therefore a primary object of the present invention to provide a novel construction for a resilient tubular conveyor of the type including a longitudinal slit which may be opened for the reception and discharge of material conveyed thereby.

Another object of the present invention is to provide a novel tubular conveyor including a cantilevered support frame or boom which conveyor is primarily adapted for the elevating of relatively viscous plastic materials.

A further object of the present invention is to provide a novel construction for a resilient tubular conveyor including means for positively opening and closing an outwardly disposed longitudinally extending slit in the tube thereof so as to insure reliable, efficient operation thereof.

Still another object of the present invention is to provide a tubular conveyor of the aforementioned type including positive means for opening the tubular conveyor belt and magnetic means to assist in the closing of the belt.

2

Still another object of the present invention is to provide a novel tubular conveyor of the elevator type which is provided with a sectional boom which may selectively be provided with a turntable mounted support.

Still a further object of the present invention is to provide a tubular conveyor of the aforementioned type including a charging hopper and an adjustable discharge chute adapted to "scrape" the interior of the tubular conveyor so as to increase the efficiency of the conveyor.

Still a further object of the present invention is to provide an endless tubular longitudinally split conveyor provided with an integral positive drive means so as to substantially eliminate slippage of the conveyor belt when elevating heavily weighted materials.

Still a further object of the present invention is to provide a novel tubular conveyor including a plurality of internally disposed radially extending circumferential ribs to assist in elevating viscous plastic substances.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged end view of the conveyor of FIGURE 1 as seen from the loading end;

FIGURE 4 is an enlarged elevational end view of the conveyor of FIGURE 1 as seen from the discharge end, further showing the manner in which the opening of the conveyor is effected;

FIGURE 5 is an enlarged vertical longitudinal sectional view of the conveyor of FIGURE 2 taken substantially along the plane of line 5—5 of FIGURE 2;

FIGURE 7 is an enlarged vertical transverse sectional view taken substantially along the plane of the line 7—7 of FIGURE 1 and further showing certain details of the telescopically received conveyor boom sections;

FIGURE 8 is a fragmentary enlarged vertical transverse sectional view of the tubular conveyor belt of the device of FIGURE 1 further showing an exemplary embodiment of magnetic closure means for the longitudinally extending slit therein;

Figure 1:
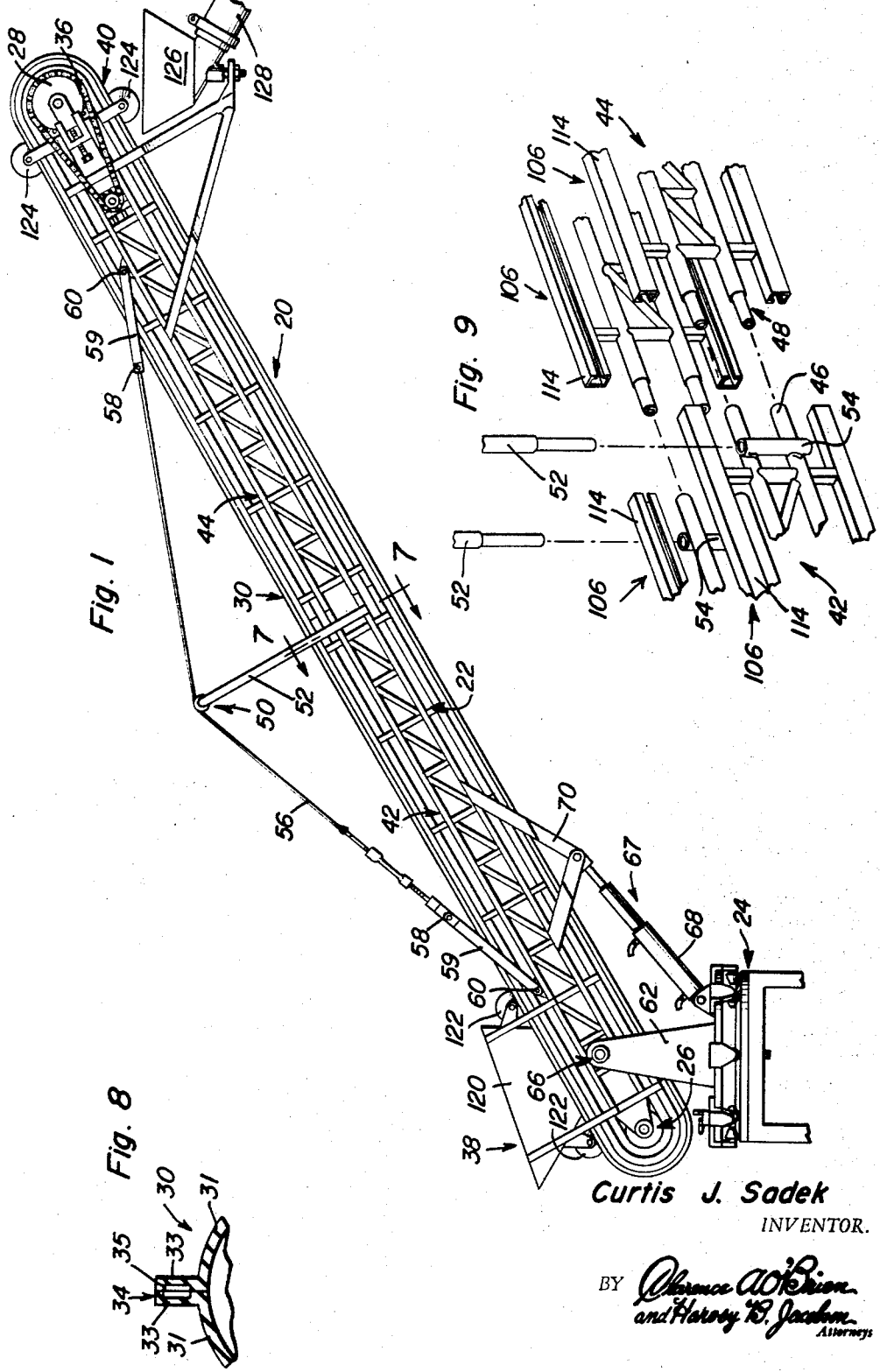
FIGURE 1 is a side elevational view of an exemplary embodiment of a boom type tubular conveyor constructed in accordance with the principles of the present invention.

FIGURE 9 is a fragmentary enlarged partially exploded perspective view of the cantilevered support boom of the exemplary embodiment of the conveyor of FIGURE 1; and FIGURE 10 is a fragmentary enlarged view of another embodiment of a conveyor constructed in accordance with the principles of the present invention and further showing certain details of a discharge scraper chute to minimize the re-conveying of plastic material within resilient tube of the conveyor.

Referring now to the drawings and particularly to FIGURES 1–5 it will be seen that an exemplary embodiment of the resilient tubular conveyor indicated generally at 20 includes a boom means 22 rotatably and pivotally supported from a boom support means 24. The conveyor 20 and particularly the boom means 22 further includes a pair of rotatably journaled end rollers 26 and 28 over which is positively driven, by means to be described, an endless resilient tube indicated generally at 30 which as seen best in FIGURE 7 is of a sleeve-like configuration defining a material carrying bore indicated generally at 32. Material to be conveyed by the conveyor 20 is introduced into the material carrying bore 32 of the tube 30 through a longitudinally extending radially oriented slit indicated at 34 which is provided on the outwardly disposed wall 31 of the tube 30.

Figure 6:
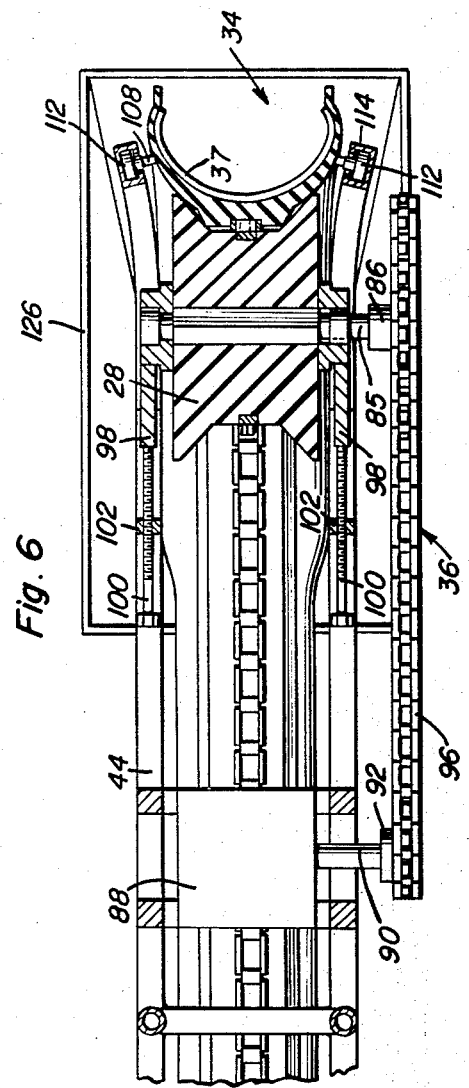
FIGURE 6 is an enlarged fragmentary horizontal longitudinal sectional view of the conveyor taken substantially along the plane of the line 6—6 of FIGURE 5.

As seen best in FIGURES 1, 5 and 6 the tubular conveyor 20 is provided with a drive means, a portion of which is indicated generally at 36, which is adapted to positively drive the endless resilient tube 30. A conveyor charging means indicated generally at 38 is provided adjacent the lower end of the conveyor and a conveyor discharging means indicated generally at 40 is provided adjacent the upper end of the conveyor flight. The boom means 22 preferably includes a plurality of telescopically engaged tubular boom sections indicated at 42 and 44, fragmentary portions of which may be best seen in FIGURE 9. The boom sections 42 and 44 comprise generally tubular cross-braced framework formed of welded tubular elements telescopically interconnected by the provision of a suitable coupling means comprising a female connector 46 adapted to telescopically receive a male connector 48. The boom section 44 is supported from, and held stationary with respect to the boom section 42 by a tensioning means indicated generally at 50 which includes an upstanding A-frame 52 the lower bifurcated end of which is received in suitable socket members 54 rigidly secured to the lower boom section 42. A cable 56 is nestingly received over the upper end of the A-frame 52 and secured by a suitable fastening means as at 58 to U-shaped brackets pivotally secured as at 60 to the respective boom sections 42 and 44. The boom 22 is pivotally supported from the turntable support means 24 by spaced apart upstanding brackets 62 having their lower ends rigidly secured, such as by welding for example, to a turntable 64 comprising a part of the turntable means 24. The boom means 22 is pivotally journaled to the support member 62 for limited pivotal movement about a horizontal axis provided by a suitable journal means as indicated at 66. The boom 22 is supported in the position shown in FIGURE 1 and pivoted about the journal 66 by a boom lift means indicated generally at 67 which includes, for example, a double-acting hydraulic cylinder 68 connected to a suitable source of fluid under pressure, not shown, operatively connected to the turntable 64 and a bracket means 70 rigidly secured to the lower boom section 42. The turntable 64 of the rotatable support means 24 is rotatably journaled to a support base 72 by means of a pivot pin 76 and a plurality of frustoconical anti-friction bearing rollers 78 rotatably journaled on downwardly depending support brackets 80 secured such as by welding to the turntable 64 which rollers 78 ride on a circumferential beveled bearing surface 74. Accordingly, it will be appreciated that the turntable 64 may rotate in a horizontal plane through 360° about the vertical axes provided by the pin 76 the upper end of which pin 76 is fixed to the plate 64 and rotatably secured to the support base 72 by a suitable lock means.

The boom means 22 and the respective upper and lower boom sections 44 and 42 are, as indicated heretofore, provided with the power operated drive means 36. It will be seen best in FIGURES 5, 6 and 7 that the power operated drive means 36 includes a chain guide means 82 comprising a pair of elongated relatively flat grooved members 82 which are secured to transverse members of the boom sections 42 and 44 and extend longitudinally therealong substantially between the end rollers 26 and 28. The upper and lower sections of the chain guide members 82 are parallel and tangentially disposed with respect to the end rollers 26 and 28 so as to support a rigid-link flexible chain means 84 or the like which passes in a continuous loop about the end rollers 26 and 28. As seen best in FIGURE 5, the end rollers 26 and 28 are provided with sprocket teeth complementary to and engaged with the sprocket chain 84. Furthermore, as seen best in FIGURE 6, the roller 28 is journaled to the boom section 44 by shaft means 85 having a drive sprocket 86 non-rotatably secured thereto. A motor 88 powered such as by fluid or electricity, for example, is secured to the upper boom section 44 and provided with an output shaft 90 and a drive sprocket 92. A rigid-link flexible drive chain 96 is operatively passed about the drive sprockets 92 and 86 so as to permit selective driving of the end roller 28. As further seen in FIGURE 6 the drive chain 96 may be tensioned by virtue of the fact that the end roller 28 is provided with adjustable end journals 98 which are selectively positioned longitudinally of the boom section 44 by suitable adjusting bolts 100 threadably received in blocks 102 secured to the frame of the boom section 44.

As will be seen best in FIGURES 6 and 7 the conveyor tube drive chain 84 in fact comprises an integral part of the endless resilient tube 30 and thus actuation of the motor 88 to drive the end roller 28 positively drives the endless resilient tube 30. In FIGURES 6 and 7 it will further be seen that the resilient wall 31 of the tube 30 is provided with a plurality of tubing wall support and guide roller means 104 yieldingly engaged in a track means 106 rigidly secured to the boom means 22. In the examplary embodiment shown, it will be seen that the roller bearing guide means 104 comprises a plurality of generally opposed outwardly extending stub shafts 108 which sealingly pass through the conveyor tube wall 31 and are secured by suitable plates 110 to the wall 31 of the conveyor tube 30, which shafts 108, on their outboard ends, rotatably carry anti-friction roller bearings 112 which rollingly track in the C-shaped track 114 of the track means 106.

Figure 2:
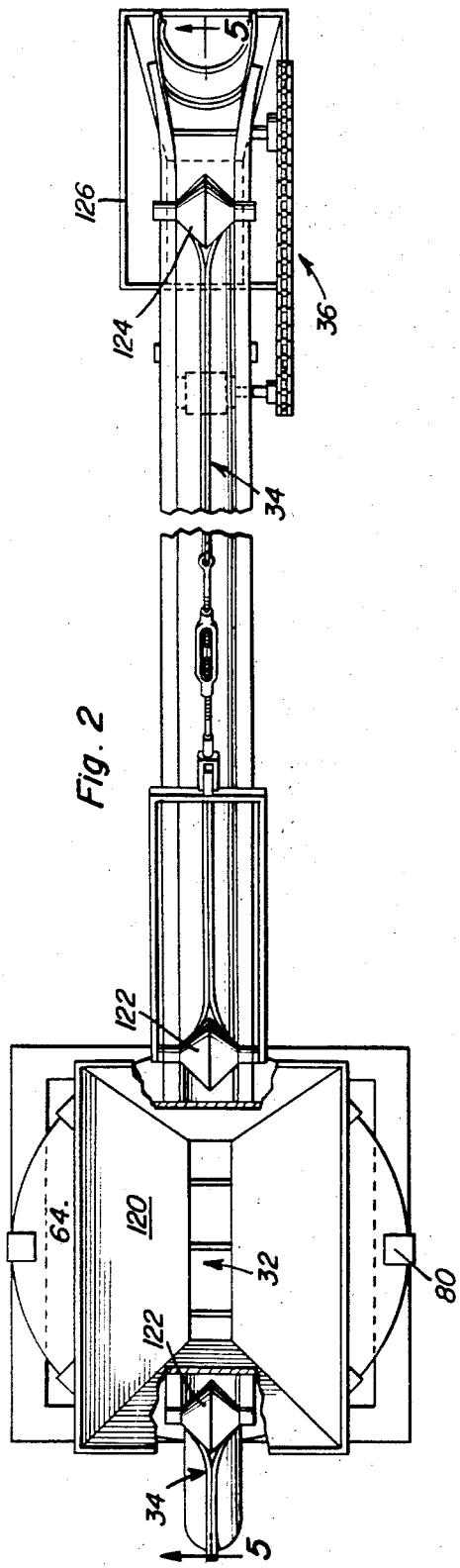
FIGURE 2 is an enlarged top plan view of the embodiment of FIGURE 1.

As seen best in FIGURE 1, the track 114 in fact comprises two continuous loops disposed in parallel relation on either side of the boom means 22 so as to normally assist a magnetic closure means, to be disclosed hereinafter, in maintaining the longitudinal slit 34 of the tube 30 closed. The charging of the material receiving bore 32 of the tube 30 with a plastic material such as concrete, to be conveyed and elevated is accomplished by the conveyor charging means 38 which includes a material charging hopper 120 having an open bottom and top and supported by suitable brackets from the lower boom section 42. The open bottom end of the charging hopper 120 is positioned in overlying relationship to the slit 34 and opening of the resilient tube 30 by spreading of the walls 31 thereof to widen the slit 34 to expose the material carrying bore 32 of the tube 30 is accomplished by a pair of tube spreader wheels 122 rotatably supported by suitable brackets from the charging hopper 120 so as to contact the tube 30 and force open the slit 34 thus effectively communicating the material receiving bore 32 of the tube 30 with the charging hopper 120 as best seen in FIGURE 2. In the preferred embodiments illustrated the tube spreading rollers 122 preferably comprise opposed frustoconical or centrally ridged rollers 122. The rollers 122 are assisted in opening the slit 34 in the area underlying the hopper 120 by virtue of the fact that the roller guide rails or tracks 114 flare outwardly at that point thus tending to pull the side walls 31 of the tube outwardly wherein the tube remains open between the longitudinally spaced rollers 122 as it travels thereby reclosing of course after passing the second roller 122. As will be seen from FIGURE 8 the lip portion 33 of the wall 31 of the tube 30 is provided with opposed magnetic elements embedded therein which magnets 35 have their magnetic fields oriented so as to normally insure a tight closure of the slit 34. While permanent magnets 35 are illustrated, it will be understood that with a suitable energizing arrangement the magnets 35 could be of an electromagnetic type.

Material charged into the material receiving bore 32 is preferably substantially precluded from back-slipping within the tube 30 by the provision of a plurality of inwardly projecting circumferentially disposed longitudinally spaced treads integral with or rigidly secured to the interior of the tube walls 31. However, as will be seen from a discussion of FIGURE 10 following hereinafter the interior of the tube 30 is not necessarily provided with the treads 37.

Referring once again to the conveyor discharging means 40 it will be seen that the pair of opposed rollers 124 analogous to the rollers 122 are rotatably secured to the boom means 22 and positioned so as to urge the slit 34 open. As with the charging means 38 the discharging means 40 is also assisted by the outward flaring of the tracks 114 so as to effect spreading of the side walls 31 of the tube 30 as the rollers 112 track therein as best seen in FIGURE 6 thereby permitting the material traveling upwardly within the tube 30 to drop outwardly therefrom such as into a discharge hopper 126 having an outlet tube 128 which hopper 126 is supported by suitable brackets from the upper boom section 44 so as to selectively permit placement of the material discharging from the tube 30. The discharge means 40 may further include a scraping chute means 130 as best seen in the alternate embodiment of the invention illustrated in FIGURE 10, whereby, as indicated heretofore, the tube 30 has a generally smooth material receiving bore 32 wherein the chute 130 projects inwardly within the open slit 34 into approximate contact with the interior of the tube 30 so as to "scrape" the material out of the tube thus assuring that a residual amount of the material being conveyed does not travel around whereby it will substantially reduce the efficiency of the conveyor.

From the foregoing it will be apparent that there has been provided a resilient tubular conveyor of a construction characterized by numerous inherent advantages over tubular conveyors proposed heretofore. It will further be appreciated that the several objects of the invention are satisfied by the examplary embodiments of the invention illustrated and described herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tubular conveyor comprising in combination a boom means, roller means adjacent each end of said boom means for rotatably supporting an endless resilient conveyor tube, said resilient conveyor tube having a longitudinally extending radially and outwardly disposed normally closed slit therethrough, an endless track means carried by said boom and disposed on both sides of said resilient conveyor tube, anti-friction roller means carried by and outwardly projecting from said resilient tube and continuously and non-releasably tracking in said endless track means to normally maintain said resilient conveyor tube closed, said track means being flared outwardly along portions thereof corresponding to conveyor tube charging and discharging points whereby opening and closing of said longitudinally extending normally closed slit in said tube is effected as the continuously tracking rollers are urged outwardly by the outwardly flared portions of said endless track means and means bearing against said slit adjacent the charging and discharging points to assist said endless track means and said continuously tracking rollers in opening said longitudinally extending slit adjacent the charging and discharging points along said conveyor tube.

2. The combination of claim 1 including magnetic means carried by said conveyor tube adjacent said longitudinally extending slit therein so as to assist in selectively maintaining said slit closed, said magnetic means comprising a plurality of longitudinally spaced magnetic members disposed in normally attracting relationship on either side of said slit so as to normally magnetically assist in maintaining said slit closed.

3. The combination of claim 1 including a rotatable support means adapted to be secured adjacent one end of said boom means, said rotatable support means being provided with a boom lift means operatively connected between said rotatable support and said boom means.

4. The combination of claim 1 including charging and discharging hopper means carried by said boom means positioned in overlying relationship to the charging and discharging points along said conveyor tube.

5. The combination of claim 1 wherein said boom means comprises a plurality of telescopically joined boom sections, said telescopically received boom sections being adapted to be maintained in secured relationship by a boom tensioning means, said boom tensioning means including an upstanding A-frame positioned intermediate of the ends of said boom, and tensioning cables secured to each of said boom portions adjacent their ends.

6. The combination of claim 1 including power operated drive means operatively associated with said boom means and at least one of said end roller means on said boom whereby said end roller means may be power driven, means carried by said power operated end roller means to drivingly engage a positively driven member carried by said conveyor tube so as to selectively permit positive driving of said conveyor tube.

7. The combination of claim 1 wherein said end roller means is provided with a centrally disposed circumferentially extending sprocket adapted to positively engage a rigid-like flexible drive chain integral with the conveyor tube, said boom means being further provided with a longitudinally extending chain guide means tangentially disposed with regard to said end roller means so as to substantially bridge the distance therebetween whereby said conveyor tube may ride therealong and travel between said end roller means.

8. The combination of claim 1 wherein said means bearing against said slit comprises a pair of longitudinally spaced rollers, each roller increasing in the thickness radially inward from a narrow slit engaged outer rim whereby progressive movement of the tube past the first spreader roller of each pair results in a spreading of the slit and an exposure of the interior of the tube, one end of said boom between the spreader rollers of the corresponding pair of rollers constitutes a discharge end, a material receiving hopper located below said discharge end, and scraper means mounted on said boom, said scraper means projecting into said tube through the spread slit above the material receiving hopper.

References Cited

UNITED STATES PATENTS

| 282,210 | 7/1883 | Meltzer | 198—119 |
| 1,710,883 | 4/1929 | Llewellyn | 198—188 X |
| 2,199,935 | 5/1940 | Johns | 198—201 X |
| 3,180,479 | 4/1965 | Meeks | 198—204 X |
| 3,326,354 | 6/1967 | Aydelott | 198—184 |

FOREIGN PATENTS

| 444,549 | 3/1936 | Great Britain. |
| 941,477 | 4/1956 | Germany. |
| 1,016,190 | 9/1957 | Germany. |
| 1,191,172 | 4/1959 | France. |

EDWARD A. SROKA, Primary Examiner.

U.S. Cl. X.R.

198—191